G. C. JESSUP.
POWER TRANSMISSION.
APPLICATION FILED MAY 17, 1919.
1,338,832.
Patented May 4, 1920.
3 SHEETS—SHEET 1.
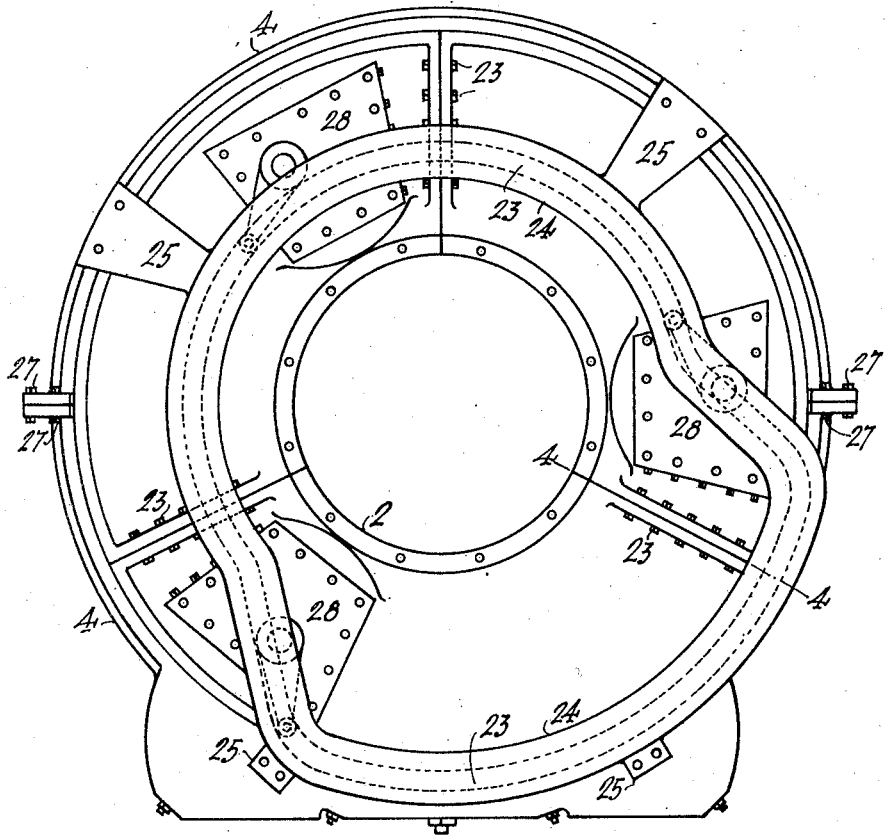
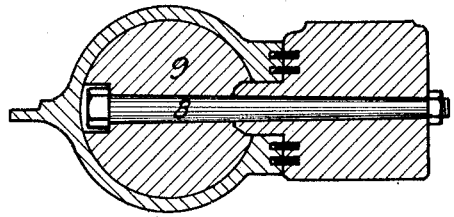
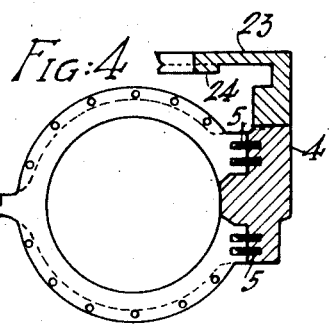
INVENTOR
George C. Jessup.

G. C. JESSUP.
POWER TRANSMISSION.
APPLICATION FILED MAY 17, 1919.
1,338,832.
Patented May 4, 1920.
3 SHEETS—SHEET 2.
Fig:2
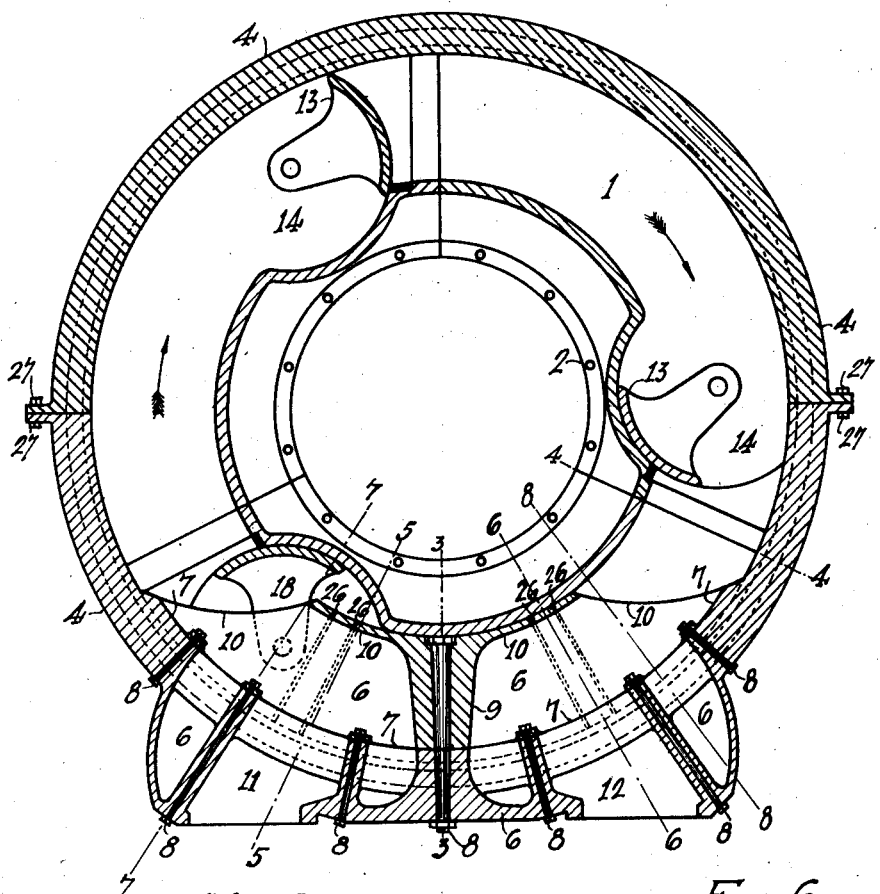
Fig:5
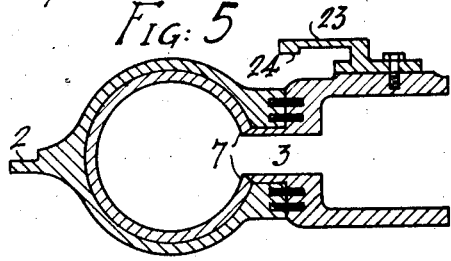
Fig:6
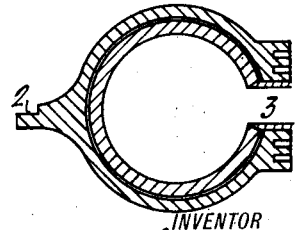
INVENTOR
George C. Jessup.
BY
ATTORNEY G. C. JESSUP.
POWER TRANSMISSION.
APPLICATION FILED MAY 17, 1919.
1,338,832.
Patented May 4, 1920.
3 SHEETS—SHEET 3.
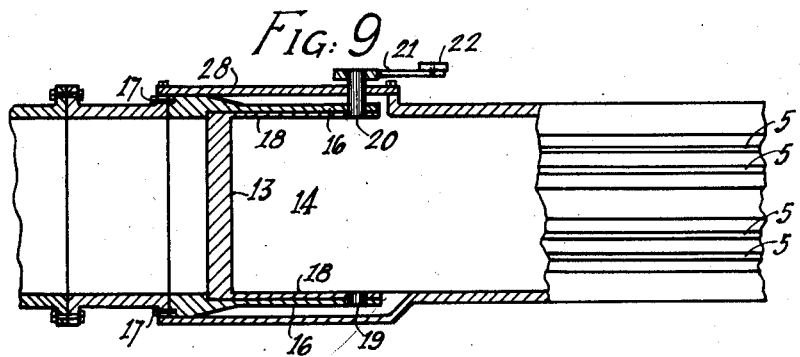
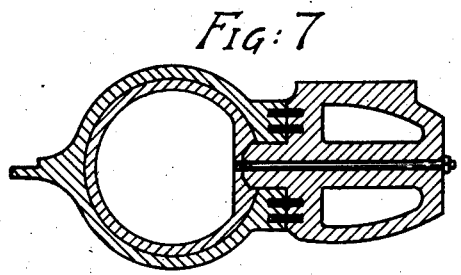
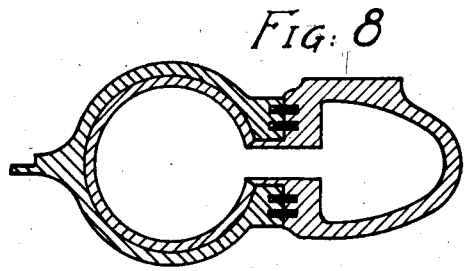
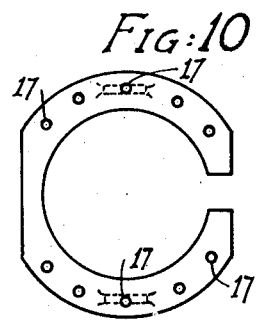
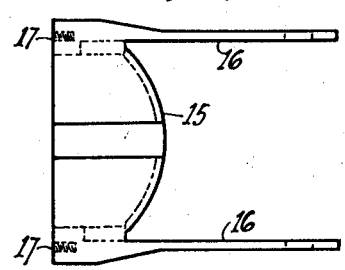
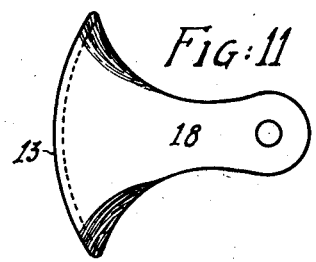
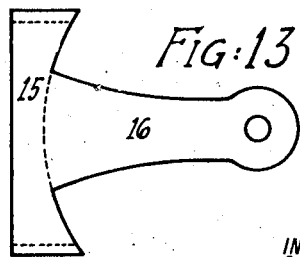
INVENTOR
George C. Jessup.
BY
ATTORNEY

UNITED STATES PATENT OFFICE.

GEORGE C. JESSUP, OF CAMDEN, NEW JERSEY.

POWER TRANSMISSION.

1,338,832.   Specification of Letters Patent.   Patented May 4, 1920.

Application filed May 17, 1919. Serial No. 297,808.

*To all whom it may concern:*

Be it known that I, GEORGE CARR JESSUP, a citizen of the United States, residing at Camden, in the county of Camden, State of New Jersey, have invented a new and useful Improvement in Power Transmission, of which the following is a specification.

My invention relates to fluid transmission of power and is intended especially for the use of oil as a motive agent; and the object of my invention is the production of novel and efficient means for the use of oil or other equivalent fluid as a motive agent for the driving of mechanisms, and especially motor vehicles, with a steadily sustained force.

The principal features of my device comprise a continuously slotted hollow circular element functioning as a cylinder, a second element embodying a piston, positioned within said element functioning as a cylinder, and having an extension exterior to said cylinder element, induction and eduction ports for the supply and exhaust of motive fluid to and from said cylinder element, and means for closing the continuous slot of said cylinder element: one of said principal elements being fixed to the driving element of a machine or vehicle, and the other of said principal elements being fixed to the frame of said machine or vehicle.

Necessarily one of the principal elements of my device must be so constructed and disposed as to rotate or revolve relatively to the other and the cylinder element may be arranged and formed to rotate relatively to the piston element, or the piston element may be arranged and formed to revolve relatively to the cylinder element. Such transference of mobility from one element to the other necessitates considerable modification of each of those elements which modifications may be effected without a departure from the essence of my invention. In the present specification, however, I shall disclose my invention in that particular form in which the cylinder element rotates while the piston element is stationary.

In the accompanying drawings, forming a part of this specification, Figure 1 is a side elevation of my device; Fig. 2 is a vertical mid-sectional view thereof; Fig. 3 is a cross-section taken on the line 3—3 in Fig. 2; Fig. 4 is a cross-section taken on the line 4—4 in Figs. 1 and 2; Fig. 5 is a cross-section taken on the line 5—5 in Fig. 2; Fig. 6 is a cross-section of the cylinder taken on the line 6—6 in Fig. 2; Fig. 7 is a cross-section taken on the line 7—7 in Fig. 2; Fig. 8 is a cross-section taken on the line 8—8 in Fig. 2; Fig. 9 is a view, partly in mid-section of one of the valve-chambers and valve-cages, showing a valve in its closed position, and showing a part of the inner periphery of the cylinder with its bushings; Fig. 10 is an end view of a valve-cage, shown in Fig. 12; Fig. 11 is a side view of a valve; Fig. 12 is a plan view of a valve-seat; and Fig. 13 is a side view of a valve cage.

The cylinder, 1, which is preferably formed in three sections which are united by bolts, is substantially circular in cross-section, and is provided in its inner periphery with a continuous flange, 2, adapted to be bolted to the main drive wheel of a differential or other equivalent motive element. Throughout its exterior face or periphery is formed a continuous opening or slot, 3, to receive the curved member, 4, which closes said slot at all points not covered by or inclosed within the piston-member, 6, and by means of the gaskets, 5, filling continuous complementary grooves in the opposing faces of the cylinder and said member, 4, the motive fluid within the cylinder is prevented from escaping through the joint between the cylinder and said member, 4. Said member, 4, is formed in sections, two of which are, preferably, formed integral with the piston-member, 6, while the third part thereof is bolted at its ends to the adjacent ends of the other parts thereof. See Fig. 2. The piston-member, 6, is formed, preferably, in two sections which meet at the curved line, 7, (see Figs. 2 and 5); and the parts are firmly connected by the bolts, 8. In the middle of the piston-member is formed the partition, or piston proper, 9 (see Figs. 2 and 3), which closes the external opening or slot, 3, and the chamber of the cylinder, and, with the laterally-extending wing-walls, 10, prevents all flow of the motive fluid past it. A port, 11, is formed in the piston-member, 6, for the admission to the chamber of the cylinder, 1, of motive fluid, which is conveyed thereto by a pipe (not shown), through which it is forced by a pump. Another port, 12, is formed in said piston-member for the emission from the cylinder of the motive fluid carried thereby; and said port, 12, is connected with another pipe (not shown) through which said fluid is returned to the pump or to a reservoir.

To utilize the motive fluid in the rotation of the cylinder and the differential drive, or other equivalent element, I provide a plurality of curved valves, 13, which are positioned to close within the cylinder-chamber and divide it into compartments from which the fluid cannot escape until the valves are opened. These valves are housed in chambers, 14, the side walls of which are set out slightly beyond the lines of the main walls of the cylinder, so that when the valves reach the piston-member, 6, they will be projected into the recesses formed by the offset of the cylinder wall and will pass the piston-member without contacting therewith. See Figs. 2 and 9. The valves, 13, are fixed in cages which comprise a valve-seat, 15, and guide-arms, 16, and are fixed to the walls of the valve-chambers, 14, by the screws, 17. See Figs. 9, 10, 12 and 13. The valve-arms, 18, are provided with pintles, 19, 20, which are journaled in openings formed in the cage-arms, 16, and the pintle, 20, extends through the wall of the valve-chamber, 14, and at its outer end carries a crank, 21, on the outer end of which crank is a friction-roller, 22. See Fig. 9.

To control the valves, 13, opening them to pass the piston-member, close them after they have passed it, and hold them closed until they again approach it, I provide a continuous cam, 23, (see Figs. 1, 4 and 5), which is provided with the inwardly projecting flange, 24. The cam, 23, is rigidly attached to the piston-member, 6, and the stationary member, 4, by brackets, 25, bolted thereto. See Fig. 1. As the cylinder, 1, rotates the friction-rollers, 22, are confined within the cam, 23, by its flange, 24, and are guided by said cam to open and close the valves, 13, opening them as they approach the adjacent wing-wall 10, of the piston-member, whereby they are passed by the piston-member without contact therewith, and closing them after they have passed the other wing-wall of the piston-member, thus permitting the emission from the cylinder-chamber of the fluid behind the open valve through the exhaust port, and the intake of fluid through the other port back of the valve when again closed to force the rotation of the cylinder.

To aid in preventing leakage of the motive fluid in the cylinder, 1, past the piston, 9, and its wing-walls, 10, packing-rings, 26, are seated at intervals in circumferential grooves or slots formed in the outer face of the wing-walls, and closely contact with the inner face of the cylinder, 1. See Figs 2 and 6.

As stated, the member, 4, is formed in parts, two of which are integral with the piston-member, 6; and the parts of said member, 4, are flanged at their ends and united by bolts, 27. A number of openings equal to the number of valves intended to be installed, are formed in the side of the cylinder, 1, to permit of the installation of the valves and their cages therein. Said openings, after the valves are installed, are closed by the plates, 28, which are packed and screwed to their seats on the side of the cylinder.

As will be understood, the piston-member, 6, is rigidly secured to the frame of the machine or vehicle which the device is intended to drive, and the flange, 2, of the cylinder, 1, is bolted to the differential, or other equivalent motive element of the structure; and when the connections are made between the intake and exhaust ports of the device and the pump, or pump and reservoir, and the pump is started in operation, the cylinder rotates in the direction indicated by arrows and drives the machine or vehicle with a steady, sustained force. The movement of the cylinder may be reversed by a reversal of the course of the motive fluid, obtained by any common means, whereupon the exhaust port, 12, becomes the intake port, and the port, 11, becomes the exhaust port.

Having thus described my invention, I claim:—

1. In a rotary engine, a circular tube-like element forming a motive fluid course and having a slot in the periphery thereof, a tubular piston arranged within the tube-like element and having slots therein arranged to aline with the slot in the tube-like element to permit the inlet and exhaust of motive fluid, and a series of valves within the tube-like element.

2. In a rotary engine, a circular tube-like element forming a motive fluid course, a tubular piston therein having inlet and exhaust ports therein, a series of valves operable in the tube-like element, and means for actuating the valves to close the said element.

3. In a rotary engine, a tube-like element forming a motive fluid course, a tubular piston having open ends, a partition and inlet and exhaust ports arranged within the tube-like element, a series of pivoted valves within the tube-like element, and means for actuating said valves to alternately close and open the tube-like element, said valves being movable to positions to pass the piston.

GEORGE C. JESSUP.

Witnesses:
 HELEN K. CONNOR,
 A. G. AMES.